(12) United States Patent
Lambrinos et al.

(10) Patent No.: US 10,017,066 B2
(45) Date of Patent: Jul. 10, 2018

(54) METHOD AND SYSTEM FOR CONNECTING/DISCONNECTING AN ELECTRIC VEHICLE TO/FROM A CHARGING TERMINAL

(75) Inventors: Clément Lambrinos, Montreuil (FR); Augustin Aymeric, Ville d'Avray (FR); Raphaël Barrois, Paris (FR); Julien Rouyer, Puteaux (FR); Sandrine Ressayre, Auffargis (FR); Ruben Rodrigues, Montmorency (FR); Lionel Lebettre, Suresnes (FR)

(73) Assignee: Bluecarsharing, Puteaux (FR)

( * ) Notice: Subject to any disclaimer, the term of this patent is extended or adjusted under 35 U.S.C. 154(b) by 889 days.

(21) Appl. No.: 14/128,982

(22) PCT Filed: Jul. 2, 2012
(Under 37 CFR 1.47)

(86) PCT No.: PCT/FR2012/051524
§ 371 (c)(1),
(2), (4) Date: Jul. 7, 2014

(87) PCT Pub. No.: WO2013/001252
PCT Pub. Date: Jan. 3, 2013

(65) Prior Publication Data
US 2015/0032312 A1    Jan. 29, 2015

(30) Foreign Application Priority Data
Jun. 30, 2011   (FR) ...................................... 11 55897

(51) Int. Cl.
*B60L 11/18*   (2006.01)
*B60L 3/00*   (2006.01)
*B60L 3/04*   (2006.01)

(52) U.S. Cl.
CPC ......... *B60L 11/1838* (2013.01); *B60L 3/0038* (2013.01); *B60L 3/04* (2013.01);
(Continued)

(58) Field of Classification Search
CPC .................... B60L 11/1818; B60L 11/1846
(Continued)

(56) References Cited

U.S. PATENT DOCUMENTS 5,596,261 A * 1/1997 Suyama .............. B60L 11/1803
320/109
5,637,977 A * 6/1997 Saito ................... B60L 11/1818
320/109

(Continued)

FOREIGN PATENT DOCUMENTS

WO       2009039406 A1       3/2009

OTHER PUBLICATIONS

European Patent Office; Search Report in International Patent Application No. PCT/FR2012/051524 dated Sep. 7, 2012; 4 pages.
(Continued)

*Primary Examiner* — Redhwan K Mawari
*Assistant Examiner* — Rodney P King
(74) *Attorney, Agent, or Firm* — Wood Herron & Evans LLP

(57) ABSTRACT

The invention relates to a method for connecting/disconnecting an electric vehicle to/from a charging terminal, which includes at least one sensor arranged to detect the state of at least one element of said charging terminal, said method including at least one iteration of the following steps: measuring at least one value of at least one parameter by said sensor; comparing the value of said parameter with at least one predetermined value; and transmitting at least one datum, referred to as a notification datum, relating to said connection/disconnection. The invention also relates to (Continued)

a system for connecting/disconnecting an electric vehicle to/from a charging terminal, as well as to a charging terminal implemented in such a method and in such a system.

10 Claims, 3 Drawing Sheets

(52) U.S. Cl.
CPC ....... *B60L 11/1818* (2013.01); *B60L 11/1846* (2013.01); *B60L 2240/622* (2013.01); *B60L 2240/70* (2013.01); *B60L 2240/80* (2013.01); *B60L 2250/10* (2013.01); *B60L 2270/32* (2013.01); *B60L 2270/34* (2013.01); *Y02T 10/7005* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/169* (2013.01); *Y04S 30/14* (2013.01)

(58) Field of Classification Search
USPC .......................................................... 701/22
See application file for complete search history.

(56) References Cited

U.S. PATENT DOCUMENTS

| | | | |
|---|---|---|---|
| 2009/0143929 A1* | 6/2009 | Eberhard | H02J 7/045 701/22 |
| 2009/0204282 A1* | 8/2009 | Mizutani | F16H 59/105 701/31.7 |
| 2010/0211340 A1* | 8/2010 | Lowenthal | B60L 11/1816 702/63 |
| 2010/0280700 A1* | 11/2010 | Morgal | G06Q 10/02 701/31.4 |
| 2011/0106329 A1 | 5/2011 | Donnelly et al. | |
| 2011/0175569 A1* | 7/2011 | Austin | B60L 11/1824 320/109 |
| 2013/0297193 A1* | 11/2013 | Morisaki | B60K 6/445 701/112 |

OTHER PUBLICATIONS

French Patent Office; Search Report in French Patent Application No. 1155897 dated Mar. 8, 2012; 2 pages.

* cited by examiner

METHOD AND SYSTEM FOR CONNECTING/DISCONNECTING AN ELECTRIC VEHICLE TO/FROM A CHARGING TERMINAL

The present invention relates to a method for connection/disconnection of an electric vehicle at a charging terminal. It also relates to a system implementing such a method and also a charging terminal utilized in such a method and/or system.

The field of the invention is the field of connection and disconnection of an electric vehicle at a charging terminal.

PRIOR ART

Vehicles operating with one or more electric batteries and terminals, called charging terminals, making it possible to recharge the vehicles' batteries when the vehicle is parked, are currently known.

Existing charging terminals comprise a cable equipped at its end with a plug which is provided to cooperate with an electric socket on the vehicle in order to make an electrical connection making it possible to recharge the batteries.

The charging terminals are provided for installation in public or private car parks, given that the vehicle's electric battery or batteries are recharged when the electric vehicle is parked.

The charging terminals are exposed to external damage and in particular to malicious acts such as theft and vandalism making the charging terminals unusable, but also to acts of theft of electricity.

Moreover, at present no charging terminals are provided making it possible to ensure a correct use of the charging terminal by the users, which makes it possible to considerably reduce the risks of vandalism to the terminal.

A purpose of the invention is to overcome the abovementioned drawbacks.

Another purpose of the invention is to propose a method and a system for connection/disconnection of an electric vehicle at a charging terminal reducing acts of vandalism, and the risks of theft.

Finally, another purpose of the invention is to propose a method and a system for connection/disconnection of an electric vehicle at a charging terminal making it possible to ensure a correct use of the charging terminal.

DISCLOSURE OF THE INVENTION

The invention proposes to achieve at least one of the abovementioned purposes by a method for connection/disconnection of an electric vehicle at a charging terminal comprising at least one sensor means arranged in order to detect the state of at least one element of said charging terminal, said method comprising the following steps:
 measuring at least one value of at least one parameter by said sensor means,
 comparing the value of said parameter with at least one predetermined value, and
 reporting an anomaly, if the value is not equal to the predetermined value.

The method according to the invention thus allows a connection/disconnection of an electric vehicle to/from a charging terminal reducing acts of vandalism and the risks of theft. In fact, by the use of a sensor means arranged in order to measure at least one item of data relating to the state of an element of the connection terminal it is possible to monitor the correct use of the charging terminal by the user throughout the connecting and disconnecting steps. It could also be possible to guide the user during each of the steps for the connection/disconnection of the vehicle to/from the charging terminal.

For at least one parameter, the comparison of the measured value with a predetermined value can be carried out at a remote site, called the central site, said method also comprising sending said measured value to said central site.

As a variant, for at least one parameter, the comparison of the measured value with a predetermined value can be carried out by another device, called a rental terminal, situated on the same site as the charging terminal, said method also comprising sending said measured value to said rental terminal.

In one or other of the cases indicated above, the measured values can be sent to the remote device periodically, at the request of the remote device, or following a predetermined event, for example an identification of a user on the charging terminal.

Of course, for at least one parameter, the comparison of the measured value with a predetermined value can be carried out by the charging terminal.

In all cases, the measured value can be sent in the form of a data frame also comprising an identification number relating to the charging terminal. The data can be sent by means of an at least partly wireless communication network, such as a GPRS network. The data can also be sent by means of a wired connection.

The reporting step can comprise a step of emitting an audible and/or light signal on the charging terminal, the rental terminal, or on the vehicle associated with the charging terminal, if there is one. The signal is intended to warn the user. In the case where the signal is emitted on the vehicle, a message is displayed on the vehicle's on-board computer for example. This message can be sent to him as it is also associated with the charging terminal in a database stored in the central agency or site.

If the comparison step is not carried out by the element emitting the warning signal, in particular in the case where this element is the vehicle, the reporting step is preceded by a step of transmitting a message to this element.

The reporting step can in addition and/or instead comprise the transmission of at least one item of notification data to the user or to an operator.

The item of notification data is generally sent by the central site. If it is not this site which carries out the comparison step, this step is preceded by the transmission of a message from the element which carries out the comparison step to the central site.

The item of notification data can be transmitted to the user or the operator onto a portable communication device held by him, in the form of an SMS, MMS message, or e-mails, etc.

Of course, the same notification data or different data can be transmitted to different addressees.

By means of the notification data, it is therefore possible to indicate to the user, at his location, that the charging terminal has not been used properly. It is also possible to transmit to him information concerning the operations to be carried out for connection/disconnection of a vehicle to/from the charging terminal and indicate to him the errors that he has made.

One or more items of data can also be transmitted to the vehicle, said item(s) of data being capable of controlling the triggering of an activation signal, the activation signal preventing the starting of the vehicle.

It is also possible to envisage a message being transmitted to the vehicle, comprising an item of data capable of commanding the triggering of an activation signal, the activation signal, alone or in combination with other signals, allowing the starting of the vehicle. This message is then sent when the measured values are equal to the predetermined values.

The method according to the invention can moreover comprise steps carrying out an identification of a user, for example by means of an RFID identification but also by means of a key or input of an identifier, directly at the charging terminal or at the rental terminal.

The measured parameter can be one or more parameters chosen from the following parameters measured by one or more suitable and appropriately arranged sensors:
  position of a charging cable comprising an electrical connection plug, and/or position of the electrical connection plug,
  state of an electrical connection between the charging terminal and the vehicle, and
  open/closed position of a lid (or cover) of a compartment of the charging terminal provided for receiving the charging cable and/or the connection plug.

It will be noted that the method can comprise a step of determining a configuration (for example, collection or return of the vehicle) and, depending on the result of this step, a step of determining the parameter(s) to be compared and/or the predetermined values with which they are to be compared during the comparison step.

For example, when the vehicle is collected, it is verified that the cable is properly stowed and the lid is properly closed and, when it is returned, it is verified that the cable is properly connected to the vehicle and also that the lid is properly closed. For this, the comparison of different parameters must be requested during the comparison step.

The step of determining the configuration is most often carried out by the central site based on the data stored in its databases. It can in particular b e combined with the step of identification of the user, and consists of verifying if a vehicle is associated with the user in the databases.

This step can also be carried out by verifying that a vehicle is associated with the terminal on which the user identified himself at the time of identification, using the databases of the central site or the detection means of the charging terminal.

According to another aspect of the invention a system is proposed for connection/disconnection of an electric vehicle at a charging terminal, said system comprising:
  at least one sensor means arranged on said connection terminal and arranged in order to detect the state of at least one element of said charging terminal,
  means, called comparison means, for comparing at least one value of at least one parameter measured by said sensor means with at least one predetermined value, and
  means for reporting an anomaly, capable of being activated if the measured value does not correspond to the predetermined value.

The reporting means can in particular be means of emitting an audible and/or light signal, preferably arranged on the charging terminal or the vehicle, or means of transmission of at least one item of notification data to a user or an operator.

Advantageously, the comparison means can be arranged at a remote site, called the central site, said system also comprising means for the transmission of data from the charging terminal to said remote site.

The sensor means can comprise at least one sensor chosen from the following list:
  detector of the establishment of an electrical connection between the vehicle and the charging terminal,
  sensor of the position of an electrical connection plug,
  sensor of the position of a cable comprising an electrical connection plug, and
  sensor of the position of a cover of a compartment intended for receiving a cable/an electrical connection plug.

The system can moreover comprise identification means for the reading of at least one item of identification data of a user.

The identification means can be incorporated into the charging terminal, or in a rental terminal located on the same site as the charging terminal.

The identification means can comprise RFID identification means, biometric identification means, etc.

According to yet another aspect of the invention a charging terminal for an electric vehicle is provided, utilized in the method or the system according to the invention.

The charging terminal according to the invention comprises:
  at least one electrical connector provided for cooperating with at least one electrical connector of the vehicle in order to establish an electrical connection for charging at least one battery of said vehicle, and
  at least one sensor means arranged in order to detect the state of at least one element of said charging terminal.

The charging terminal according to the invention can moreover comprise means for the transmission/reception of data to/from a remote site and/or light or audible emission means.

The charging terminal can moreover comprise means of identification of a user such as RFID or biometric identification means.

The charging terminal can moreover comprise a compartment intended for receiving a cable/an electrical connection plug. The compartment can be equipped with a cover.

The sensor means can comprise at least one sensor chosen from the following list:
  detector of the establishment of an electrical connection between the vehicle and the charging terminal,
  sensor of the position of an electrical connection plug,
  sensor of the position of a cable comprising an electrical connection plug, and
  sensor of the position of a cover of a compartment intended for receiving a cable/an electrical connection plug.

The invention applies particularly to the management of a fleet of electric vehicles intended for rental and for which a plurality of rental stations is provided.

Other advantages and characteristics of the invention will become apparent on examination of the detailed description of an embodiment which is in no way limitative, and the attached diagrams, in which.

It is understood that the embodiments which will be described below are in no way limitative. It is possible in particular to envisage variants of the invention comprising only a selection of features described below, separately from the other features described, if this selection of features is sufficient to confer a technical advantage or to differentiate the invention from the state of the prior art. This selection comprises at least one preferably functional feature without structural details, or with only part of the structural details if this part alone is sufficient to confer a technical advantage or to differentiate the invention from the state of the prior art.

In particular all the variants and embodiments described can be combined with each other if there is no technical objection to this combination.

Figure 1:
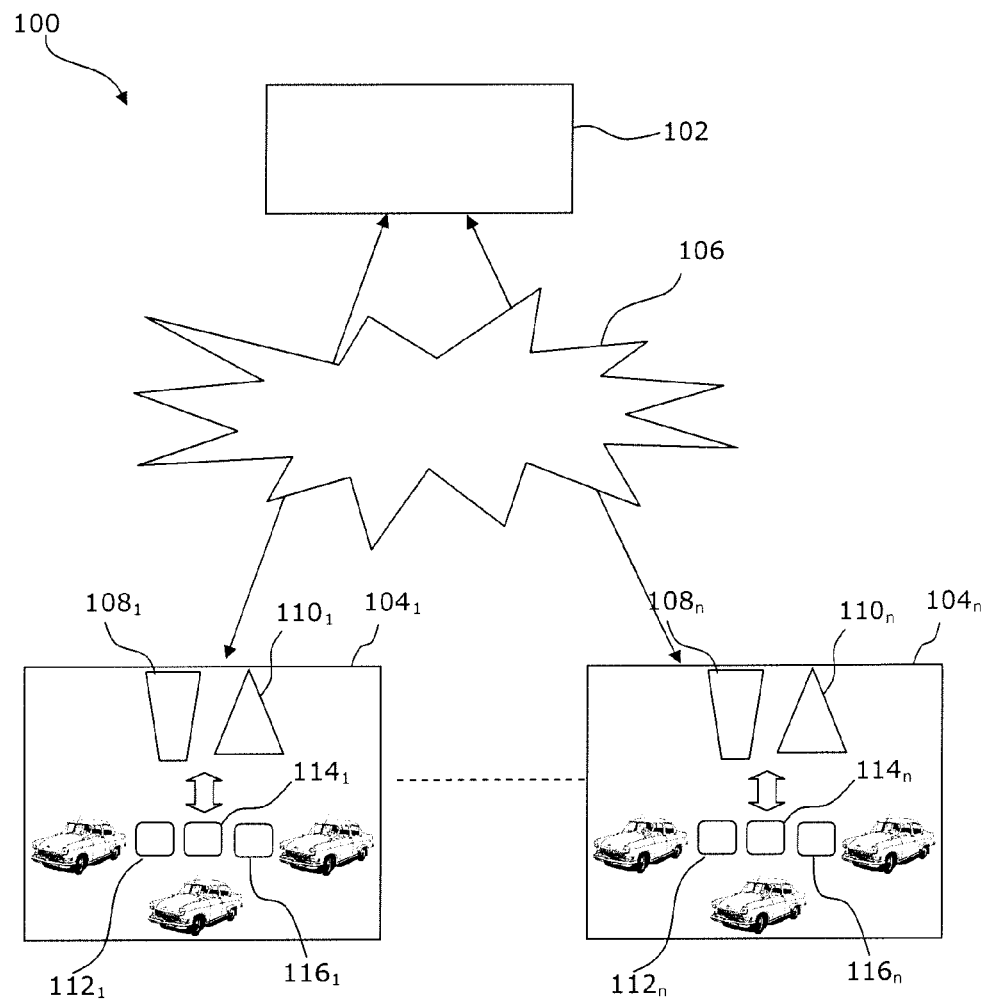
FIG. 1 is a diagrammatic representation of a system according to the invention.

FIG. 1 is a diagrammatic representation of a global management system of a fleet of electric vehicles for rental.

The system 100 shown in FIG. 1 comprises a central site 102 (also called central agency in the remainder of the description) connected to several sites—or stations—$104_1$-$104_n$, called rental sites, by means of a wireless communication network 106, for example GPRS, or a wired network, for example of DSL type. Preferably, each station is linked to the central site via both separate networks, which allows continuous connection even if one of the networks fails.

Each rental station comprises a subscription terminal 108 for registering a new subscriber, a rental terminal 110 for the rental of a vehicle and several charging terminals 112-116, each charging terminal being provided for charging a vehicle equipped with an electric battery at a parking space.

The central site 102 can be connected directly to each of the terminals of a rental station 104 by means of the network 106 or solely at the subscription terminal and/or at the rental terminal and/or at the charging terminals 112-116.

At least two terminals of a rental station are connected to each other by means of a wired connection (not shown).

The central site 102 is also arranged in order to be connected to an electric vehicle comprising a data connector to one or more elements of the vehicle and/or user communication interface, via a GPRS network. Each vehicle is for that reason equipped with a GSM chip.

The central site 102 is also arranged in order to exchange information with a portable communication device such as a PDA, a mobile phone, etc., carried by a rental service operator and also linked to the central site via a GPRS network.

The system makes it possible to manage a plurality of vehicles each comprising a control unit capable of communicating with the central agency and with different elements of the vehicle, and a user interface.

Users are capable of interacting with the different terminals as well as with the different elements of the vehicles. Moreover, the vehicle rental service with the system according to the invention can be also carried out with the help of the operators, and their mobile terminal such as a PDA, who can intervene in the service.

Figure 2:
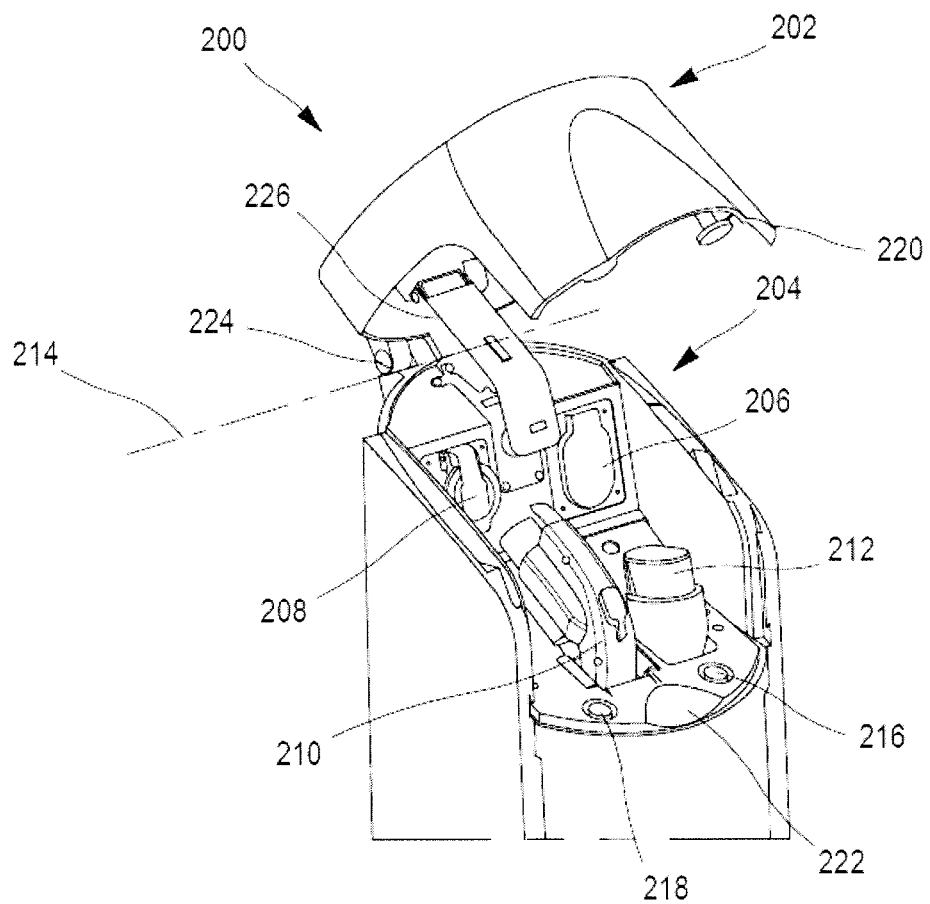
FIG. 2 is a diagrammatic representation of a charging terminal according to the invention.

FIG. 2 is a diagrammatic representation of a charging terminal according to the invention.

The charging terminal 200 comprises a movable cover or lid covering a subscriber interface area/compartment 204 that is mainly situated under the movable lid 202.

This area 204 comprises a type 3 terminal connector socket which makes it possible to supply private vehicles.

The area 204 also comprises an E/F type connector 208 for electric two-wheelers.

The area 204 also comprises a cable comprising:
at one end a type 3 connector 210 provided for connecting to the terminal connector 206, and
at the other end a connector 212 provided for connecting to a vehicle connector.

The cable (not shown) bearing these two connectors 210 and 212 is provided to be wound around a cable reel incorporated into the terminal 200.

The terminal 200 could also comprise only a female type cable or connector.

Two functional elements are also present in this area 204 above the lid 202:
identification means, such as for example an RFID target and reader (not shown), in order to allow a subscriber to access the elements under the movable lid 202, and
a state-reporting light system, for example based on LEDs (green, red, and blue) the state of which is visible on top of the movable lid 202 indicating to the subscriber the status of the vehicle parking space and of the vehicle.

The lid 202 is hinged, in particular in rotation, for example about a horizontal axis 214.

The lid 202 is lowered under its own weight over the remainder of the terminal 200 and is locked by at least one locking means, such as for example magnetic door strikes 216 and 218 which crush a sealing means, such as a sealing joint 220 making it possible to seal the compartment 204 comprising the cables.

At least one sensor means detects the position of the lid 202, for example a sensor 222 detecting its lowering.

A hinge 224 situated behind the cap allows a large opening for easy access to the charging sockets and plugs.

A suction pad 226 or an equivalent means holds the cap in the open position for a controlled time period in order to allow for handling by the subscriber.

The RFID reading function is incorporated into this cap in the form of a coupler with integrated antenna.

The closing of the lid 202 ensures the crushing of the sealing joint 220.

The status lights (red, green, blue) are incorporated into the flange of the lid. A window (not shown) on the cap allows the status of the terminal 200 to be illuminated.

Thus, when the user passes an RFID card over the reader, either in order to return the vehicle and connect it to the cable of the terminal 200, or in order to collect the vehicle and stow the cable in the compartment 204, the magnetic locks are deactivated. The user raises the lid 202 and carries out the necessary actions (stowing of the socket or connecting of the vehicle) according to the case in point. He then lowers the lid 202 (if he does not do this, the lid 202 lowers itself under its own weight). The magnetic locks 216 and 218 carry out their locking action without outside intervention if there is contact between the lid 202 and the remainder of the terminal 200. It is possible that the lid 202 may not be properly locked in the event of an obstacle preventing the closing of the lid 202 intentionally or unintentionally.

The terminal 200 therefore comprises a sensor means 222 for detecting the closing of the lid, such as for example a force sensor for detecting the weight of the lid or an optical sensor, and a sensor means for detecting the stowing of the cable, such as for example a force sensor measuring the tension of the wound or positioned cable, the stowing of the cable engaging a ratchet for example. It also comprises a sensor means, such as a pilot wire 3 (not shown), detecting whether the cable is properly plugged into the type 3 connector and the vehicle.

In a preferred embodiment, when the user unlocks the lid 202, the charging terminal 200 informs the central site and sends the user's identifier to it. The central site then stores the times for the start or end of rental.

Then, at the end of a predetermined time period following the unlocking of the lid 202 by the user, the central site queries the charging terminal or the rental terminal on the state of the sensors of the charging terminal 200. The central site is capable of communicating with the rental terminal or the charging terminal via a wireless network, such as a GPRS network or by a wired network of DSL type. The rental terminal is capable of communicating with the charging terminal via a wired network.

The message sent comprises in particular an identifier of the charging terminal.

The rental terminal or the charging terminal transmits to the central site the values associated with the parameters measured by the different sensors, each value being able to be a digital or binary value. The central site compares these to normal values for these parameters.

It will be noted that the values can be compared directly by the charging terminal or the rental terminal, in which case it is determined at one of these terminals if everything is in order for the charging terminal.

If one of the values of the sensors is not consistent with the expected value, for example cover not locked, or cable badly stowed when the vehicle is collected or no connection of the cable when the vehicle is returned, the central site notifies the user of this.

Figure 3:
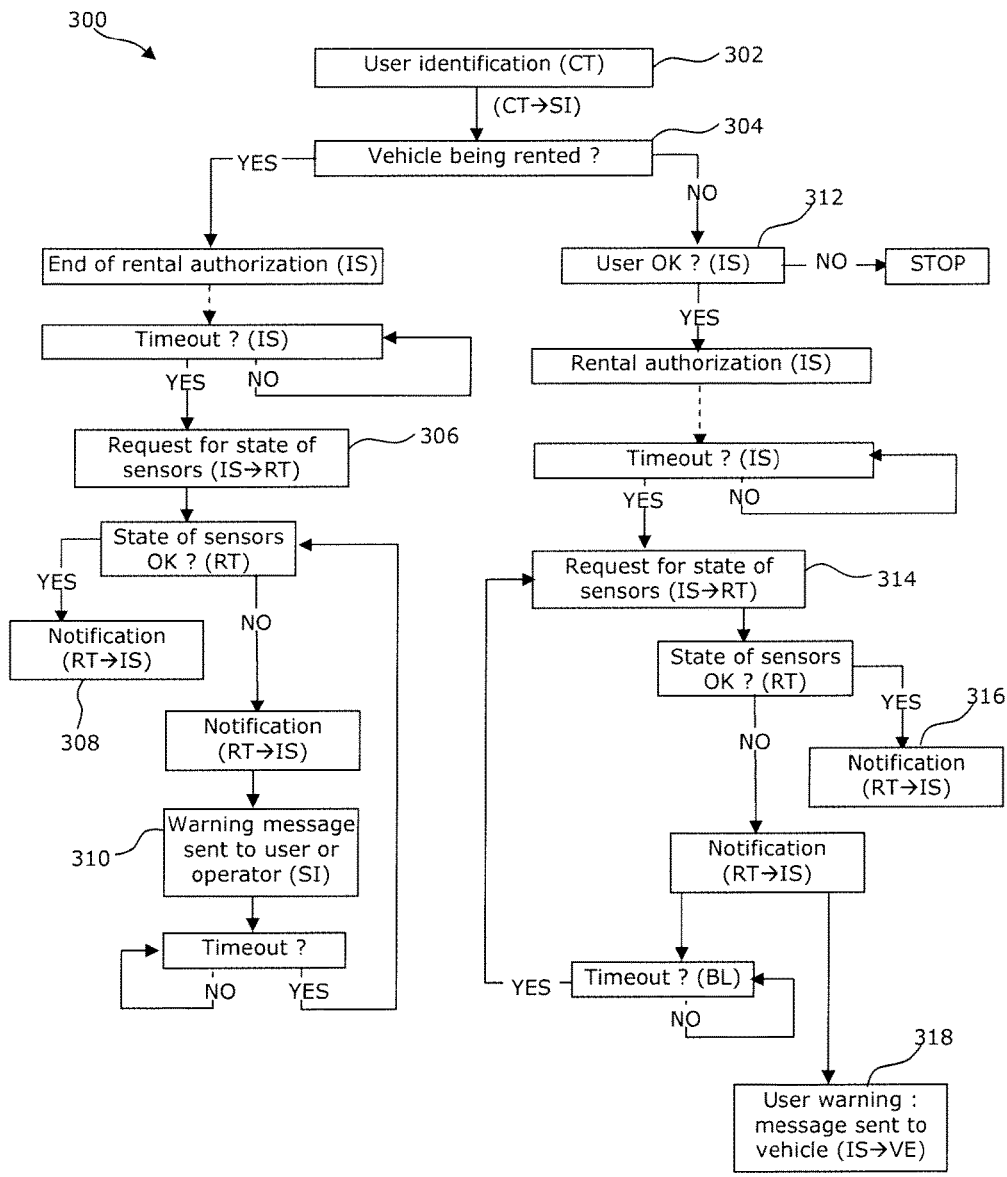
FIG. 3 is a diagrammatic representation of a method according to the invention.

A description will now be given, with reference to FIG. 3, of an example of a method according to the invention.

The method 300 comprises a user identification step 302, followed by a step 304 aimed at determining if the user has a rental vehicle (step of determining a configuration as described above). For this, the charging terminal sends a message to the central agency and the latter determines, using its stored databases, if the identified user is associated with a vehicle.

If this is the case, this means that the user wishes to initiate the end of rental procedures, whereas in the opposite case, it means that he wishes to collect a rental vehicle. It would also be possible be informed of the user's intentions locally, by verifying if a vehicle is associated with the charging terminal on which the user is identified.

In the method described, if the central agency determines that the user is associated with a vehicle, an end of rental authorization procedure, not described in detail here, is carried out by the central agency, which in particular registers the time of the identification. First sensors of the charging terminal are then queried during a step 306, after a given time period allowing the user to carry out the procedures for returning the vehicle.

If the sensors communicate a satisfactory state, an end of rental authorization notification is sent in step 308 to the central agency and the end of rental takes effect.

If the sensors communicate an unsatisfactory state, a warning is sent in step 310 to the user by the central agency, asking him to correct the anomaly, until the sensors communicate a satisfactory state. This message is for example sent to the user by SMS on a portable terminal the details of which he provided when he subscribed to the service.

If, during step 304, it is determined that the user wishes to collect a vehicle, the identity of the user is verified in step 312. If the identity is incorrect or does not correspond to a subscriber user, the procedure is stopped.

If the identity corresponds to a user, a start of rental authorization procedure is carried out.

Second sensors of the charging terminal are queried during a step 314, after a given time period allowing the user to disconnect the vehicle from the charging terminal and stow the charging cable. These sensors can be the same as the first ones, they can also be completely or partially different from these first sensors. If a part of the sensors forms a first and a second sensor, it is possible that the predetermined values with which they are compared are not the same ones.

If the sensors communicate a satisfactory state following this querying, a start of rental authorization notification is sent in step 316.

If the sensors communicate an unsatisfactory state a warning is sent to the user in step 318, asking him to correct the anomaly, until the sensors communicate a satisfactory state. This warning is sent over the interface means of the vehicle associated with the terminal. In this way, the user cannot have access to the functions offered by this interface and will be prompted to reconnect the terminal correctly.

The method according to the invention therefore comprises the following steps:
  identification of a user at a unit in the station in order to obtain authorization giving access to the charging terminal (terminal comprising a lid barring access to the charging elements, the lid being moreover locked),
  verification of the status of one or more elements of the charging terminal, and
  if the status of at least one of these elements is not consistent with a predetermined status, the user or an operator is warned.

The identification step 302 can be carried out in particular for collecting or returning a vehicle. It generally marks the start or end of rental.

This step 302 can be carried out directly on the charging terminal using a means of identification such as an RFID card. The charging terminal can in fact comprise an RFID reader.

This step 302 could however be carried out by other means (identification on the rental terminal, by input using a keyboard for example). Generally, but non-limitatively, the identification step involves the participation of the central site which comprises a database relating to the users' access rights. The charging terminal or the rental terminal communicates the user's identifier to the central site and the central site returns data relating to this user, for example, a rental authorization, a notification that a rental is in progress, etc.

The verification of the status of different elements can in particular be the verification of:
  locking the lid of the charging terminal a predetermined time period after the unlocking of the latter by the user or the identification of the user at the station, detection by a sensor such as a position sensor, for example an optical sensor, or a force sensor;
  returned position of the charging cable, for example by the use of a force or position sensor; and/or
  connection of the cable to the vehicle, for example by a pilot wire.

As regards the verification of the status of the elements of the charging terminal, this verification can be carried out at the central site or at the station (charging terminal or rental terminal).

In the case where this step is carried out by the central site, the vehicle can periodically forward the information relating to the sensor to the central agency.

Preferably, the central site queries the vehicle a predetermined time period, for example, 2 minutes, after the identification step has been carried out, as described above. In response to this querying, the charging terminal, optionally via the rental terminal, transmits the state of the sensors. The central site compares these with normal values stored in a database and determines if there is an anomaly on the charging terminal.

In the case where this step is carried out by the station, the charging terminal collects the values relating to the state of the sensors and compares these with predetermined values.

The rental terminal can in this case bring about a return to the central site if it detects an anomaly.

The warning or notification of the user can be carried out in several ways, optionally combined:
  warning by SMS, e-mail,
  warning via a vehicle interface, and/or
  warning via an audible or light signal on the charging terminal.

The steps of the method can be carried out when a vehicle is collected. The locking of the lid and the returned position of the cable are then preferably verified. Preferably, the message is in this case displayed on the electric vehicle. It is even possible to envisage preventing the starting of the electric vehicle if the status of the terminal is not considered to be normal.

The steps of the method can also be carried out when a vehicle is returned, in which case the locking of the lid and the connecting of the cable to the vehicle is preferably verified. The message is then sent to the user on his mobile, preferably by SMS. It can also be sent to an operator of the service.

As a variant, it would be possible to envisage the central agency controlling the rental terminal in order to carry out the necessary verifications. Such a message from the central agency could also comprise an indication of the values to be verified (a link to a data model to be verified situated in the rental terminal or the values to be verified directly), that it would determine as a function of the conditions (start or end of rental).

In another variant, it would also be possible to envisage the rental terminal itself initiating the verifications. It then itself determines which are the data to be verified as a function of the data received from the central agency during the identification of the user.

When it is the rental terminal that carries out the different verifications, it generally notifies the central agency of this. It can also notify the central agency that everything is normal. If the central agency receives no response at the end of a predetermined time, it can also warn an operator.

In a first embodiment (in particular when the vehicle is returned), in order to notify the user, the central agency composes a message to the user indicating in particular the anomaly and/or the address of the station and inviting him to attend this station in order to correct the anomaly. This message is sent to the user by SMS.

This is carried out by a communication unit of the central agency comprising in particular a GSM chip allowing it to communicate with any mobile phone. The user's mobile phone number is to be found in an internal database of the central agency.

It is also possible to envisage the message being sent to a rental service operator if the user's number is not available or cannot be reached. It can also be envisaged that the end of rental time remains unchanged within a given time period (for example 15 minutes) but that the end of rental time is changed (time of resolution of the anomaly) if the user does not correct said anomaly. It is also possible to envisage sending a message to an operator of the system at the end of the predetermined time period for resolution of the problem.

If the user does not manage to solve the problem due to an internal failure of the charging terminal, he can request the help of an operator or report it on the rental terminal in which case his end of rental time is not changed and an operator is called.

In a second embodiment (in particular when the vehicle is collected), the central agency composes a message to be sent to the vehicle. The latter also comprises a communication unit making it possible to communicate with the central agency by means of the GPRS network. It also comprises an on-board computer forming an interface means on which the message is displayed. For sending this message, the central agency consults a database in which each charging terminal is associated with the vehicle parked in the space corresponding to this charging terminal and sends the message to the corresponding vehicle.

It is also possible to envisage the central agency sending to the vehicle, in addition to or instead of the message, an item of data activating a control signal preventing the starting of the vehicle while the charging terminal is not under optimum conditions. The starting of the vehicle can in fact be dependent on a plurality of starting signals (signal activated by the item of data+signal sent by starter means such as a key or starter button for example). This would then make it possible to ensure that the user starting the vehicle has indeed left the terminal in good order. In order to do this, the vehicle comprises a control unit linked to the network and to different elements of the vehicle and making it possible to control these elements. The central agency can in this case send two separate messages to the control unit and to the interface unit, each of which communicates a priori separately with the central agency.

Similarly, if the user does not manage to solve the problem due to an internal failure of the charging terminal, he can request the help of an operator or report it on the rental terminal in which case an operator is called. In this case, the rental is cancelled and another vehicle is allocated to the user. The vehicle and the space where it is located can moreover be declared unavailable.

Of course the invention is not limited to the examples which have just been described.

The invention claimed is:

1. A method for connection/disconnection of an electric vehicle at a charging terminal comprising at least one sensor means configured to detect the state of at least one element of said charging terminal, the method comprising the following steps:
  measuring, by said sensor means, at least one value of at least one parameter relating to the state of an element of said charging terminal,
  comparing with a computer, the value of said parameter with at least one predetermined value, and
  reporting an anomaly relating to said element, if the value is not equal to the predetermined value,
    said reporting step also comprising transmission of one or more items of data to the vehicle, said item(s) of data controlling the triggering of an activation signal preventing the starting of the vehicle.

2. The method according to claim 1, characterized in that, for at least one parameter, the comparison of the measured value with a predetermined value is carried out at a remote site, called the central site, said method also comprising sending said measured value to said central site.

3. The method according to claim 1, characterized in that for at least one parameter, the comparison of the measured value with a predetermined value is carried out by another device, called a rental terminal, said method also comprising sending said measured value to said rental terminal.

4. The method according to claim 1, in which the reporting step comprises a step of emitting a light and/or audible signal on the charging terminal, the rental terminal, or on the vehicle associated with the charging terminal.

5. The method according to claim 1, in which the reporting step comprises a step of transmitting at least one item of notification data to the user or to an operator.

6. The method according to claim 1, comprising a user identification step.

7. The method according to claim 1, in which the measured parameter comprises one or more parameters chosen from the following parameters measured by one or more suitable and appropriately arranged sensors:
- a position of a charging cable comprising an electrical connection plug, and/or position of the electrical connection plug,
- a state of an electrical connection between the charging terminal and the vehicle, and
- an open/closed position of a lid (or cover) of a compartment of the charging terminal provided for receiving the charging cable and/or the connection plug.

8. The method according to claim 1, further comprising a step of determining a configuration (collection or return of the vehicle) and, depending on the result of this step, a step of determining the parameter(s) to be compared and/or the predetermined values with which they are to be compared during the comparison step.

9. A system for connection/disconnection of an electric vehicle at a charging terminal, said system comprising:
- at least one sensor means arranged on said charging terminal and configured to detect the state of at least one element of said charging terminal,
- comparison means for comparing at least one value of at least one parameter measured by said sensor means with at least one predetermined value, and
- means for reporting an anomaly relating to said at least one element of said charging terminal if the measured value is not equal to the predetermined value,
    - said means for reporting being configured for transmission of one or more items of data to the vehicle, said item(s) of data being capable of controlling the triggering of an activation signal preventing the starting of the vehicle.

10. The system according to claim 9, characterized in that the comparison means are arranged at a remote site, said system also comprising means for the transmission of data from the charging terminal to said remote site.

* * * * *